Sept. 23, 1969  J. E. PETER  3,467,981

CASTER BRAKE MECHANISM

Filed Sept. 21, 1967

INVENTOR

JOSEPH E. PETER

BY *Melville, Strasser, Foster and Hoffman*
ATTORNEYS

United States Patent Office 3,467,981
Patented Sept. 23, 1969

3,467,981
CASTER BRAKE MECHANISM
Joseph E. Peter, Cincinnati, Ohio, assignor to The Hamilton Caster & Mfg. Co., Hamilton, Ohio, a corporation of Ohio
Filed Sept. 21, 1967, Ser. No. 669,484
Int. Cl. B60b 33/00; F16d 55/00
U.S. Cl. 16—35                             9 Claims

ABSTRACT OF THE DISCLOSURE

A caster provided with a normally horizontally disposed brake treadle having a centrally disposed hub pivotally mounted on the caster axle bolt, the hub of the treadle being provided with spaced apart tapered raceways defining cam surfaces which contact ball bearings received in bores in one leg of the caster yoke, the ball bearings contacting steel plungers slidably received in the bores. When the treadle is rocked in either direction, the ball bearings ride inwardly along the tapered surfaces of the raceways, thereby displacing the plungers inwardly where they contact a washer to effect axial displacement of the caster wheel, causing it to frictionally engage the opposite leg of the caster fork. When the brake arm is rocked in the opposite direction, the clamping pressure on the caster wheel is released. In an alternative embodiment of the invention, the ball bearings and plungers are replaced by plungers having rounded heads which engage the raceways.

Background of the invention

The present invention relates to caster wheels of the type utilized on a wide variety of carts, dollies and the like, and has to do more particularly with the provision of an improved braking mechanism for the caster wheels. More particularly, the instant invention relates to a caster brake mechanism wherein the caster wheel may be readily locked and unlocked by means of a horizontally disposed treadle projecting outwardly from the forward and rear sides of the caster which may be readily engaged and the brake set or released by the user.

While various caster brake mechanisms have hitherto been proposed, including mechanisms wherein the caster wheel is cammed into engagement with a fork of the caster yoke, such mechanisms have generally been complicated in construction or difficult to actuate, particularly when it is desired to release the caster wheel for rotation. This is due in large measure to the fact that the clamping pressure is applied only to one side of the caster wheel resulting in cocking forces which provide non-uniform clamping pressure and often render the brake difficult to release.

Representative examples of the prior art are to be found in Young U.S. Patent 918,636, Johnson U.S. Patent 1,137,329, Noelting et al. U.S. Patent 1,863,349, Wolters U.S. Patent 1,953,900 and Macintosh U.S. Patent 2,081,594.

Summary of the invention

In accordance with the instant invention, uniform clamping pressure is applied to the caster wheel by reason of a series of equally spaced apart plungers which, when displaced by movement of the treadle, apply essentially uniform clamping pressure to one side of the caster wheel, thereby causing direct axial displacement of the wheel as opposed to the cocking forces applied where the wheel is engaged at only one point. The rounded heads of the plungers in contact with the tapered cam surfaces are easily actuated and produce an anti-friction effect which effect is increased where the plungers are actuated by separate ball bearings which are free to revolve relative to both the plungers and the cam defining raceways.

The brake mechanism is of simplified construction requiring only a one-piece treadle, the hub of which is adapted to be mounted on the caster wheel bolt and is configured to provide the tapered raceways which coact with the plungers and/or ball bearings to effect the axial displacement of the caster wheel. By having the treadle project both forwardly and rearwardly of the caster wheel, one or the other of the treadle ends will be readily accessible irrespective of the position of the wheel itself, and the brake mechanism locks with equal effectiveness irrespective of which end of the treadle is depressed.

Description of the preferred embodiments

Figure 1:
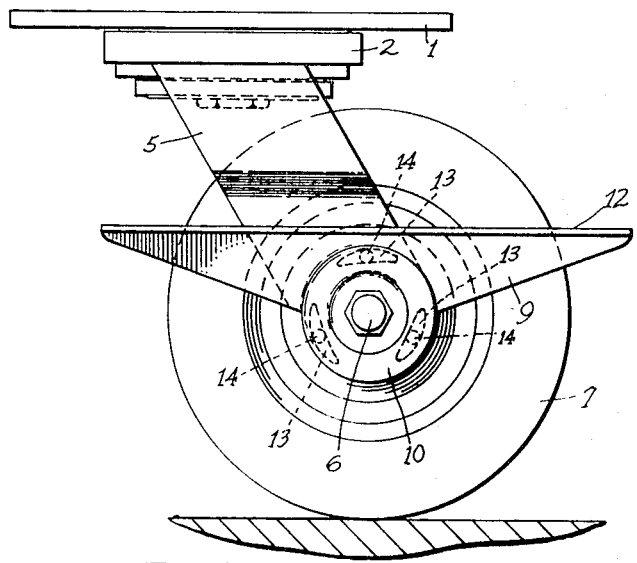
FIGURE 1 is a side elevational view of a caster embodying the brake mechanism of the instant invention.
Figure 2:
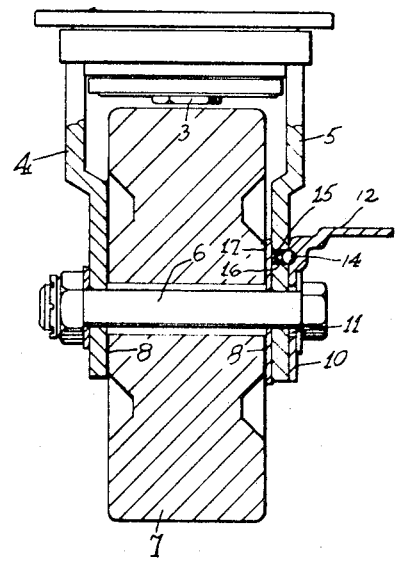
FIGURE 2 is a vertical sectional view taken along the irregular line 2—2 of FIGURE 1.

Referring first to FIGURES 1 and 2, the caster comprises a top plate 1 to which the yoke plate 2 is pivotally connected by means of pivot pin 3. A yoke composed of legs 4 and 5 project downwardly from the yoke base and mount an axle bolt 6 adjacent their free ends on which the wheel 7 is rotatably journaled, the wheel having a hub 8. The construction thus far described is conventional and the general configuration of the parts or the manner in which the yoke base is pivoted to the top plate do not constitute limitations on the invention.

In accordance with the invention, a treadle 9 is pivotally mounted on the axle bolt 6, the treadle having a hub 10 with a centrally disposed bolt receiving opening 11 therein. The treadle is adapted to be horizontally disposed with respect to the caster and is provided with an elongated horizontally disposed flange 12 the opposite ends of which project outwardly beyond the periphery of the wheel 7. Preferably the treadle will comprise a unitary stamping formed from case hardened steel.

The hub 10 is provided with a plurality of raceways 13, preferably three, equally spaced from each other and circumferentially disposed with respect to the axis of rotation of the treadle hub 10. A ball bearing 14 is received in each of the raceways, the ball bearings also being received in bores 15 in leg 5 of the yoke, as will be seen in FIGURE 2. The bores 15 also contain plungers 16 which extend inwardly through the leg 5 where they are adapted to make contact with a washer 17 lying between leg 5 and the adjacent surface of wheel hub 8.

Figure 3:
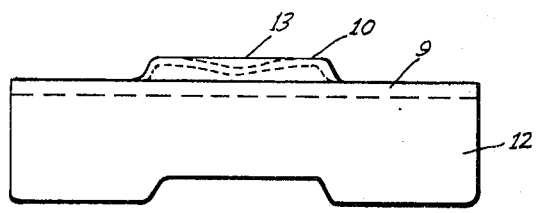
FIGURE 3 is a plan view of the treadle.
Figure 4:
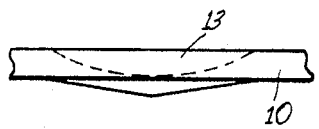
FIGURE 4 is an enlarged fragmentary plan view of the treadle hub illustrating the configuration of the tapered raceway.

As will be evident from FIGURES 3 and 4, each of the raceways 13 is of tapered configuration being wider at its center than at its opposite ends and also deeper in the center than at its opposite ends. Preferably, the width of the raceway at its center will be approximately equal to the diameter of the ball bearing 14, although the depth of the raceway at its center, which is its deepest point, is preferably no greater than the radius of the ball bearing, as will be evident from FIGURE 2. It will also be apparent that the ball bearings at all time remain at least partially contained within the bores 15 which are of a size to permit the balls to move axially within the bores.

The circumferential positioning of the raceways is such that the treadle 9 will be horizontally disposed when the ball bearings are centered in the raceways, as is illustrated in FIGURE 1. Upon depression of the treadle from either end, it will be evident that the raceways will be rotated to bring one or the other of their tapered ends into contact with the ball bearings, the effect of such movement being to cam the ball bearings into the bores 15 which results in the inward axial displacement of the plungers 16. The inner ends of the plungers bear against the washer 17 forcing it into contact with the opposing surface of wheel hub 8. To the extent that there is any looseness or axial play between the opposing hub of the wheel and the opposite leg 4 of the yoke, the wheel will be displaced axially with the opposite hub 8 frictionally engaged against the inner surface of leg 4. The wheel is thus securely clamped between the washer 17 and the leg 4 and hence held against rotation. It will be evident that the further the treadle is depressed, the tighter will become the clamping engagement between the parts.

When it is desired to release the wheel for rotation, the user has only to return the treadle to its horizontal position, either by stepping on its opposite end or lifting up on its depressed end, to release the clamping pressure, the ball bearings riding into the deepest and widest portions of the raceways.

Figure 5:
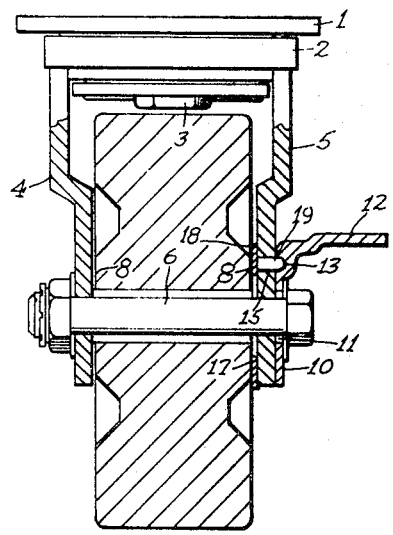
FIGURE 5 is a vertical sectional view similar to FIGURE 2 but illustrating an alternative embodiment of the invention.

In the modification of the invention illustrated in FIGURE 5, wherein like parts have been given like reference numerals where applicable, the ball bearings 14 and co-acting plungers 16 have been replaced by plungers 18 having rounded outer ends 19 which engage the raceways 13. It will be evident that when the treadle is depressed, the rounded ends 19 of the plungers will be contacted by the tapered surfaces of the raceways and the plungers displaced inwardly to enter into clamping engagement with the wheel. While it is preferred that the inner ends of the plungers contact a washer, such as the washer 17 shown in FIGURE 2, the inner ends of the plungers may make direct contact with the hub of the wheel.

Modifications may be made in the invention without departing from its spirit and purpose. For example, where the thickness of the metal legs 4 and 5 is insufficient to provide a plunger receiving bore, the effective thickness of the leg may be increased by laminating one or more additional thicknesses of metal to its lowermost end or by making the entire leg 5 of a greater thickness than the leg 4.

The embodiments of the invention in which an exclusive property or privilege is claimed are defined as follows:

1. In a caster having a pair of spaced apart fork defining legs, an axle bolt extending between said legs, and a wheel mounted on said axle bolt, a brake mechanism comprising an elongated treadle pivotally mounted on said axle bolt and juxtaposed to the outer side of one of said legs, said treadle including a hub having a circumferentially disposed tapered raceway formed therein, a bore in said last named leg in alignment with said raceway, an axially displaceable plunger in said bore, and means at the outer end of said plunger engaging said tapered raceway, pivoting movement of treadle acting to move said tapered raceway relative to said raceway engaging means to thereby effect axial displacement of said plunger in the direction of said wheel.

2. The caster brake mechanism claimed in claim 1 wherein said elongated raceway is tapered at both ends, being wider and deeper at its center than at its opposite ends, whereby said treadle may be pivoted in either direction to effect axial displacement of said plunger.

3. The caster brake mechanism claimed in claim 2 wherein a plurality of said raceways are circumferentially arranged around said hub in equally spaced apart relation, and wherein a plunger received in an aligned bore is provided for each of said raceways.

4. The caster brake mechanism claimed in claim 3 wherein the raceway engaging means at the outer ends of said plungers comprise rounded ends on said plungers.

5. The caster brake mechanism claimed in claim 3 wherein the raceway engaging means at the outer ends of said plungers comprise ball bearings received in said bores between the outer ends of said plungers and said raceways.

6. The caster brake mechanism claimed in claim 1 including a washer surrounding said axle bolt between said wheel and the said last named leg of said caster fork, said washer being of a size to cover the inner end of said bore so as to be contactable by said plunger, the said caster wheel having a hub facing said washer.

7. The caster brake mechanism claimed in claim 6 wherein a plurality of said raceways are circumferentially arranged around said hub in spaced apart relation, and wherein a plunger received in an aligned bore is provided for each of said raceways.

8. The caster brake mechanism claimed in claim 1 wherein both ends of said elongated treadle project beyond the periphery of said caster wheel, and wherein said treadle includes a horizontally disposed flange extending along its upper edge.

9. The caster brake mechanism claimed in claim 8 wherein said elongated raceway is tapered at both ends, being wider and deeper at its center than at its opposite ends, and wherein said treadle is horizontally disposed when said plunger is aligned with the center of said raceway.

References Cited

UNITED STATES PATENTS

| 2,188,648 | 1/1940 | Bouvier et al. | 16—35 |
| 2,227,832 | 1/1941 | Herold | 16—35 |
| 1,863,349 | 6/1932 | Noelting et al. | 16—35 |

BOBBY R. GAY, Primary Examiner

D. L. TROUTMAN, Assistant Examiner

U.S. Cl. X.R.

188—1